B. A. GOULD.
PROCESS OF TREATING SUBSTANCES.
APPLICATION FILED MAR. 6, 1920.
1,400,484.
Patented Dec. 13, 1921.
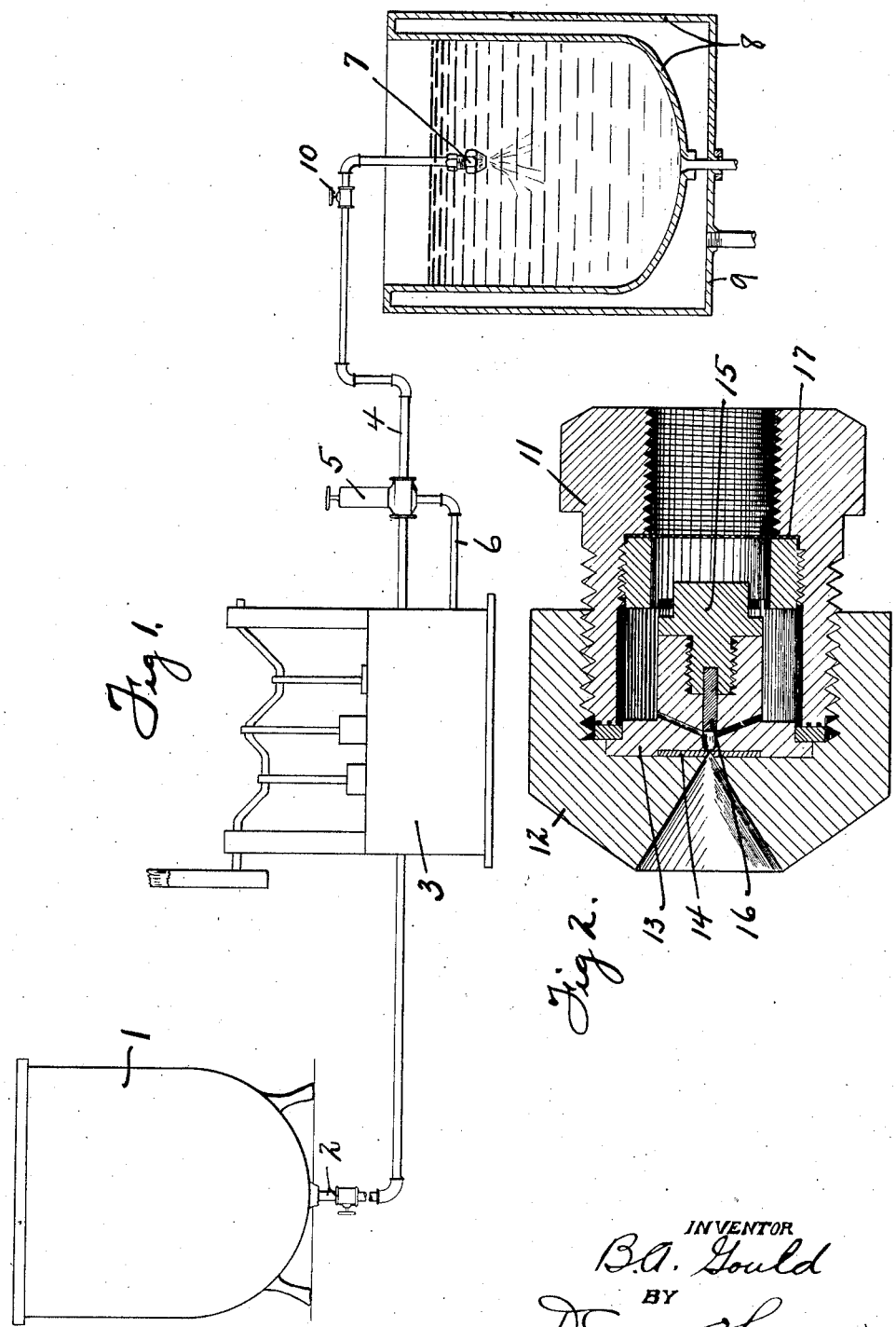
INVENTOR
B.A. Gould
BY
ATTORNEY

UNITED STATES PATENT OFFICE.

BENJAMIN A. GOULD, OF TORONTO, ONTARIO, CANADA, ASSIGNOR TO MERRELL-SOULE COMPANY, OF SYRACUSE, NEW YORK, A CORPORATION OF NEW YORK.

PROCESS OF TREATING SUBSTANCES.

1,400,484. Specification of Letters Patent. Patented Dec. 13, 1921.

Application filed March 6, 1920. Serial No. 363,757.

*To all whom it may concern:*

Be it known that I, BENJAMIN A. GOULD, of Toronto, in the Province of Ontario, in the Dominion of Canada, have invented new and useful Improvements in Process of Treating Substances, of which the following, taken in connection with the accompanying drawings, is a full, clear, and exact description.

This invention relates to a new and useful method of combining substances with perhaps particular reference to the emulsification of fat with a liquid.

By the term "emulsification" as used in the specification and claims hereof, I intend to include any mixture, solution, combination, emulsification or compound of two or more substances without regard to the physical or chemical condition of the particles of the product.

By reason of my peculiar familiarity with the milk industry and my original conception and adaptation of this process as applied to milk products, I will describe my process in its application to the production of food products embodying milk, not by way of limitation, but solely for the purpose of concrete illustration which by analogy will disclose the application of the process to various industries and substances.

Perhaps the most valuable commercial adaptation of the process resides in its application to the production of a liquid milk product by combining skim milk powder, water and butter fat. The advantages of such a product or emulsion are many and important.

For instance, by reason of the difficulty of producing a milk powder containing substantial amounts of butter fat that will not rapidly deteriorate the commercial manufacture of milk powder has been largely limited to the production of skim milk powder and the use of milk powder has been materially restricted by the absence of incorporated fat, which is quite essential to the reconstitution of the powder into normal milk.

Further, the presence of incorporated fat in the reconstituted milk is very desirable— if not essential—when the product is to be used in the manufacture of various articles of food, such as bakery products, pastry, candies, etc.

Further, it is very desirable under many conditions and circumstances to produce a product substantially like normal milk and which can be sold in bottled form, or stored in that form or other suitable containers and upon which cream will rise in substantially the same manner as upon normal milk, which cream may be easily remixed with the remaining portions of the milk in like manner as the same process is carried out with ordinary bottled milk.

A material advantage of this process resides in the fact that milk products can be produced at the place where it may be desirable to use the same, and particularly at points, as large cities, or places so geographically situated that normal liquid milk either cannot be obtained or is obtained only at high expense, and, perhaps, with great difficulty. By my process a product can be produced from skim milk powder, water and butter fat that will approximate normal liquid milk in its constituent elements and the relation of these elements to each other and the effect of the action of gravity upon them.

Broadly construed, my process comprises the introduction of one substance under pressure in atomized form into a body of the other substance. There are many desirable and perhaps preferred details of the process either constituting a portion of or additional to the broader aspect just described. A complete process in its preferred form as applied to the combination of skim milk powder, butter fat and water may be described as follows:

The skim milk powder is first dissolved in a proper solution of water, as, for instance, one pound of milk powder to ten pounds of water, preferably this mixture is heated to a temperature preferably approximately 145 degrees Fahrenheit, as I have found that this step assists in producing an excellent solution of the substance. The solution is then cooled to approximately a temperature of 100 degrees Fahrenheit, at which temperature I find that my process may be carried out most effectively. The butter fat, preferably in clarified condition, is introduced under pressure into the body of the solution of skim milk powder and water in an atomized condition. This incorporation or introduction may be effected by means of a spray nozzle immersed in the solution and from which the butter fat is ejected through a minute orifice under high pressure in minutely sub-divided form. I have found that an effective positioning of the parts is realized when the discharge orifice of the spray nozzle is approximately three inches below the level of the skim milk in the tank. This is, however, capable of wide variation.

Any pressure capable of forcing the butter fat through a sufficiently contracted orifice so as to subdivide the particles of the butter fat so minutely as to approximately the size of the butter fat particles in normal milk is capable of carrying out my process, and any pressure above the limit set may be used in the production of milk products differing only in size of the butter fat particles but all capable and adapted for producing a product, the butter fat particles of which may be readily remixed with the other portions of the product after gravity has effected such separation as may take place in a product of the character of that produced. As illustrative, the higher the pressure, the smaller will be the particles of butter fat, and with very high pressures homogenization will be effected.

The result of this condition is that the cream line formed by gravity separation in connection with normal milk will not be produced, an effect not at all injurious to the product but rendering it perhaps less salable in bottled form by reason of the fact that the purchasing public have been educated to expect and demand milk in connection with which gravity separation forms a cream line. By cream line I mean an apparent line of demarcation between cream that has risen and the other contents of the container.

In order to produce the cream line of normal milk my process must be carried out within certain limits of pressure, etc. Preferably the butter fat should be sprayed or atomized into the body of the solution under pressure approximately seven hundred pounds. This is effected by forcing the butter oil under hydraulic or other pressure approximating seven hundred pounds through a minute orifice submerged within the solution and preferably this orifice may vary from .023 to .027 of an inch. It is found that when these preferred pressures are utilized that a larged percentage of the particles of butter fat are somewhat smaller than similar particles of normal milk but as with every process of atomization absolute uniformity of particles cannot be obtained it is desirable to reduce the size of the greater majority of particles below the size of similar particles in normal milk so that the few particles that exist in larger sizes shall preferably not materially exceed the size of the particles of fat in normal milk.

The emulsion should then be heated to at least 135 degrees Fahrenheit, and may, if desired, be pasteurized at a temperature of 145 degrees Fahrenheit for twenty minutes.

Preferably the product is then cooled to a temperature approximating 60 degrees Fahrenheit, and may then be stored in bottles or other containers, and the cream line similar to that produced in normal milk will develop in less than twelve hours. The lower the temperature at which the product is stored the longer the time required for the cream line to develop. The cream which rises to the surface or appears on the top of the bottles will after the expiration of twelve hours be quite heavy and approximately equal to that produced on normal milk, assuming that the milk contains substantially the same amount of fat, but will remix easily with the rest of the milk even after five days' storage.

I have discovered that by adding a small quantity of natural milk, as skim milk, to the solution of milk powder and water, or milk powder, water and butter fat either before or after spraying the butter oil and fat into the solution I am able to increase the apparent amount of cream and lower the cream line on the containing receptacle over that formed in connection even with normal milk of the same butter fat content, and this is a valuable attribute of milk to be sold for household use.

I have used to advantage as low as $12\frac{1}{2}\%$ of natural skim milk combined with a solution of milk powder and water, but higher percentages may be used with proportionately increased advantage.

In the drawings Figure 1 is a plan view partially in section and somewhat diagrammatic of an apparatus capable of carrying out the process of this invention.

Fig. 2 is a cross section through a spray nozzle adapted for use in my process.

The apparatus illustrated for carrying out my process comprises a vat —1— adapted to contain butter oil or butter fat, and this vat may be jacketed for heating purposes in usual and well known manner to melt the butter oil and maintain the same in liquid, fluid condition preferably at a temperature approximately 100 degrees Fahrenheit. This vat has a valved discharge pipe —2— leading from its bottom and connecting with a high pressure pump —3— which may be a triple acting pump of the usual and well known construction not necessary to herein further illustrate or describe. Preferably the vat —1— is disposed some distance above the pump —3— so as to maintain a head of liquid in the pump. It is desirable that a column of butter oil four feet in height be maintained at the front of the pump. The pipe line —4— leading from the pump —3— is equipped with a relief valve —5— and return to permit circulation of the butter oil through the pump under any condition of operation that may make that action necessary. The pipe line —4— is equipped with and terminates in a spray nozzle —7— adapted to be disposed within tank —8— provided with jacket —9— forming a space for the reception of steam or other fluid to heat the tank —8—. The level of liquid within tank —8— may be maintained at any desired plane with respect to the spray nozzle —7— so long as the discharge orifice from latter is beneath the surface of the liquid, and, as stated, an efficient arrangement is realized when the discharge orifice from the spray nozzle is disposed approximately three inches beneath the upper surface of the liquid.

In operation the vat —1— may be filled to the desired extent with skimmed milk or other fluid, or in the particular adaption of the process as here described it may contain a mixture of skim milk powder and water. That mixture, compound or solution may be produced within the tank —8— by therein combining skim milk powder and water, preferably through the medium of suitable agitation effected in any manner capable of producing a solution. For this purpose, the tank —8— may, if desired, be equipped with a rotary stirring device, or the solution may be produced at some other point and in some other receptacle and conveyed for use to the tank —8—. Into this solution or body of liquid the butter oil is atomized or sprayed.

The line —4— is further provided with a valve —10— to shut off the flow of butter oil to the nozzle —7—.

It will be understood that the mechanical construction of all of the parts so far described is purely arbitrary, and that various changes and modifications may be made, the particular apparatus shown being purely illustrative, and for the purpose of a detailed description of the desired subdivisions of the particles of the butter fat, I have illustrated in detail a spray nozzle adapted for that purpose.

This spray nozzle is of the construction shown and described and claimed in Letters Patent of the United States, No. 1,183,393, issued May 16, 1916, to Merrell-Soule Co., as the assignee of Irving S. Merrell and Oliver Edward Merrell, and comprising a body —11—, a cap —12—, a casing —13—, a spray disk —14—, a plug —15—, a plug pin —16—, a screen —17—, a screen support ring or sleeve —18—, all as illustrated and described in said Letters Patent.

As before stated, the orifice through the spray disk may preferably be from .023 to .027 of an inch in diameter. This, however, may be varied within limits in accordance with the pressure exerted upon the liquid to be sprayed by the pump —3—.

Although I have shown and described a specific apparatus and various details of construction of the same together with preferred steps, pressures, temperatures, etc., as constituting features of my process, I do not desire to limit myself to the same, as various changes, modifications and substitutions may be made within the scope of the appended claims.

What I claim is:

1. The process comprising subjecting an oil to high pressure, atomizing it beneath the surface of a body of liquid by forcing it by such pressure through a minute orifice beneath the surface of the liquid.

2. The process of combining an oil with a liquid containing a solid, comprising atomizing the oil beneath the surface of the liquid by forcing the oil under high pressure through a minute orifice beneath the surface of the liquid.

3. The process of combining butter fat with skim milk solids and water, comprising atomizing the butter fat into a solution of skim milk solids and water by forcing the butter fat under high pressure through a minute orifice beneath the surface of the solution.

4. A process of combining butter fat with skim milk solids and water, comprising atomizing the butter fat into a solution of skim milk solids and water by forcing the fat under pressure not substantially less than 700 lbs. to the square inch through a minute orifice.

5. The process of combining butter fat with skim milk solids and water, comprising atomizing the butter fat into a solution of skim mild solids and water by forcing the fat under pressure not substantially less than 700 pounds to the square inch through an orifice not substantially larger than .027 of an inch in diameter.

6. The process comprising subjecting an oil to high pressure, forcing it through a minute orifice by such pressure and into a body of liquid at a point beneath the surface of the liquid.

7. The process comprising subjecting an oil to high pressure, forcing it through a minute orifice by such pressure and into a solution of milk powder and water at a point beneath the surface of the solution.

8. The process comprising forming a solution of skim milk powder and water, heating the solution to a temperature approximating 145° F., cooling the solution to a temperature approximating 100° F., heating an oil, subjecting the oil to high pressure, forcing the oil by such pressure through a minute orifice and into the said solution of milk powder and water, at a point beneath the surface of such solution.

9. The process comprising forming a solution of skim milk powder and water, pasteurizing the solution, subjecting butter fat to high pressure and forcing it by such pressure through a minute orifice, into the said solution at a point beneath the surface thereof.

10. The process of combining butter fat with skim milk solids and water comprising atomizing the butter fat into a solution of skim milk solids and water by forcing the fat under high pressure through a minute orifice not substantially larger than .027 of an inch in diameter.

11. The process of combining butter fat with skim milk solids and water, comprising reducing the butter fat to atomized particles not substantially larger than the butter fat particles of normal milk, by forcing the butter fat under high pressure through a minute orifice positioned beneath the surface of the solution.

12. The process of combining butter fat with skim milk solids and water comprising reducing the butter fat to atomized particles of approximately the size of the butter fat particles of normal milk, by forcing the butter fat under high pressure through a minute orifice positioned beneath the surface of the solution.

13. The process of combining butter fat with skim milk solids and water, comprising forcing the butter fat under a pressure not substantially less than 700 pounds per square inch through an orifice not substantially larger than .027 of an inch in diameter, and into the solution of skim milk solids and water.

14. The process of combining an oil with skim milk solids and water comprising atomizing the oil beneath the surface of a body of liquid by forcing it through a minute orifice beneath the surface of the liquid.

In witness whereof I have hereunto set my hand this 19th day of February, 1920.

BENJAMIN A. GOULD.

Witnesses:
IRVING S. MERRELL,
A. M. RUSSELL.